United States Patent
Koch et al.

(10) Patent No.: US 10,115,512 B2
(45) Date of Patent: Oct. 30, 2018

(54) SWITCHING ARRANGEMENT

(71) Applicant: Tyco Electronics AMP GmbH, Bensheim (DE)

(72) Inventors: Harry Koch, Berlin (DE); Matthias Kroeker, Mittenwalde-Ragow (DE); Christian Lindner, Berlin (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 14/750,012

(22) Filed: Jun. 25, 2015

(65) Prior Publication Data
US 2015/0380145 A1 Dec. 31, 2015

(30) Foreign Application Priority Data
Jun. 25, 2014 (DE) .................. 10 2014 212 132

(51) Int. Cl.
| | |
|---|---|
| *H01H 3/00* | (2006.01) |
| *H01F 7/18* | (2006.01) |
| *H01H 1/20* | (2006.01) |
| *H01H 71/04* | (2006.01) |
| *G01S 17/06* | (2006.01) |
| *H01H 1/00* | (2006.01) |

(52) U.S. Cl.
CPC ............ *H01F 7/1844* (2013.01); *G01S 17/06* (2013.01); *H01H 1/20* (2013.01); *H01H 71/04* (2013.01); *H01H 1/0015* (2013.01); *H01H 2071/048* (2013.01)

(58) Field of Classification Search
CPC ...... H01H 2071/048; H01H 1/00; H01H 1/20; H01H 1/0015; H01H 71/04; H01F 7/1844; H01F 7/18; G01S 17/06

USPC .......................................................... 335/185
See application file for complete search history.

(56) References Cited

U.S. PATENT DOCUMENTS

| | | | | |
|---|---|---|---|---|
| 3,956,649 | A | * 5/1976 | Silverman | H02K 19/24 310/111 |
| 4,513,208 | A | * 4/1985 | Kamata | H01H 9/168 218/84 |
| 4,608,620 | A | 8/1986 | Hines | |
| 4,706,073 | A | * 11/1987 | Vila Masot | G08B 21/185 337/206 |
| 6,066,999 | A | * 5/2000 | Pischinger | F01L 9/04 335/226 |

(Continued)

FOREIGN PATENT DOCUMENTS

| | | |
|---|---|---|
| CN | 101053050 A | 10/2007 |
| DE | 29923323 U1 | 8/2000 |

(Continued)

OTHER PUBLICATIONS

Extended European Search Report, Application No. 15173735.0, dated Nov. 20, 2015, 10 pages.

(Continued)

*Primary Examiner* — Shawki S Ismail
*Assistant Examiner* — Lisa Homza
(74) *Attorney, Agent, or Firm* — Barley Snyder

(57) ABSTRACT

A switch assembly has two contacts; a switch having an open position in which the contacts are electrically separated from one another; and a switch status detector positioned remotely from the switch.

9 Claims, 3 Drawing Sheets

(56) References Cited

U.S. PATENT DOCUMENTS

| | | | | | |
|---|---|---|---|---|---|
| 6,331,687 | B1* | 12/2001 | Dunk | ................ | H01H 11/0062 |
| | | | | | 218/140 |
| 6,648,297 | B1* | 11/2003 | Butzmann | ................ | F01L 9/04 |
| | | | | | 251/129.15 |
| 7,623,010 | B2* | 11/2009 | Liu | ................ | H01H 50/32 |
| | | | | | 335/107 |
| 8,456,259 | B2* | 6/2013 | Safreed, III | ................ | H01H 9/20 |
| | | | | | 200/330 |
| 2006/0125596 | A1* | 6/2006 | Darr | ................ | H01H 9/104 |
| | | | | | 337/194 |
| 2007/0271746 | A1* | 11/2007 | Midorikawa | ................ | B60R 22/48 |
| | | | | | 24/633 |
| 2008/0158788 | A1* | 7/2008 | Darr | ................ | H01H 9/104 |
| | | | | | 361/647 |
| 2011/0163836 | A1* | 7/2011 | Darr | ................ | H01H 9/10 |
| | | | | | 337/143 |
| 2011/0163837 | A1* | 7/2011 | Darr | ................ | H01H 9/104 |
| | | | | | 337/186 |
| 2011/0169599 | A1* | 7/2011 | Darr | ................ | H01H 9/10 |
| | | | | | 337/143 |
| 2011/0193675 | A1* | 8/2011 | Darr | ................ | H01H 9/104 |
| | | | | | 337/187 |
| 2011/0234210 | A1* | 9/2011 | Hayashi | ................ | G01B 7/003 |
| | | | | | 324/207.15 |
| 2011/0273249 | A1* | 11/2011 | Wan | ................ | H01H 71/04 |
| | | | | | 335/11 |
| 2013/0090748 | A1* | 4/2013 | LaFrance | ................ | H01H 71/125 |
| | | | | | 700/67 |
| 2013/0335174 | A1 | 12/2013 | Kodama et al. | | |

FOREIGN PATENT DOCUMENTS

| | | |
|---|---|---|
| DE | 19941108 A1 | 3/2001 |
| DE | 102004053612 A1 | 5/2006 |
| DE | 102010043352 A1 | 5/2012 |
| WO | 2012116824 A1 | 9/2012 |

OTHER PUBLICATIONS

European Official Communication, dated May 22, 2017, 5 pages.
English translation of Chinese First Office Action, dated Feb. 1, 2018, 10 pages.

* cited by examiner

SWITCHING ARRANGEMENT

CROSS-REFERENCE TO RELATED APPLICATION

This application claims the benefit of the filing date under 35 U.S.C. § 119(a)-(d) of German Patent Application No. 102014212132.9, dated Jun. 25, 2014.

FIELD OF THE INVENTION

The invention is generally related to an electrical switching assembly, and, more specifically, to an electrical switching assembly a contact-free switch status detector.

BACKGROUND

High-voltage and high-current switching assemblies are used, for example, in electrically operated cars. In order to ensure that no dangerous voltages or currents are present during car maintenance, it is necessary to be able to detect that the switching device is adequately insulated.

Conventionally, one such approach is to take a measurement directly from the electric circuit. Often auxiliary relays serve to couple measurement devices to the circuit. However, this is process and design is very complex.

Another conventional approach is to use a micro-switch to detect the position of the switching assembly. However, this approach is often unreliable since parts of the micro-switch can break down, influencing the switching device so that it no longer functions reliably. Moreover, such a solution is often not effective, because high voltage can be present at the micro-switch under certain circumstances.

There is a need for an alternative approach to easily and reliably ascertain whether the switching assembly is insulated.

SUMMARY

A switch assembly has two contacts; a switch having an open position in which the contacts are electrically separated from one another; and a switch status detector positioned remotely from the switch.

BRIEF DESCRIPTION OF THE DRAWINGS

The invention will now be described by way of example, with reference to the accompanying Figures, of which.

DETAILED DESCRIPTION OF THE EMBODIMENT(S)

A switching arrangement 1 will be described with reference to FIGS. 1-3. The term "switching assembly" is used interchangeably with the term "switching arrangement" in the following description.

Figure 1:
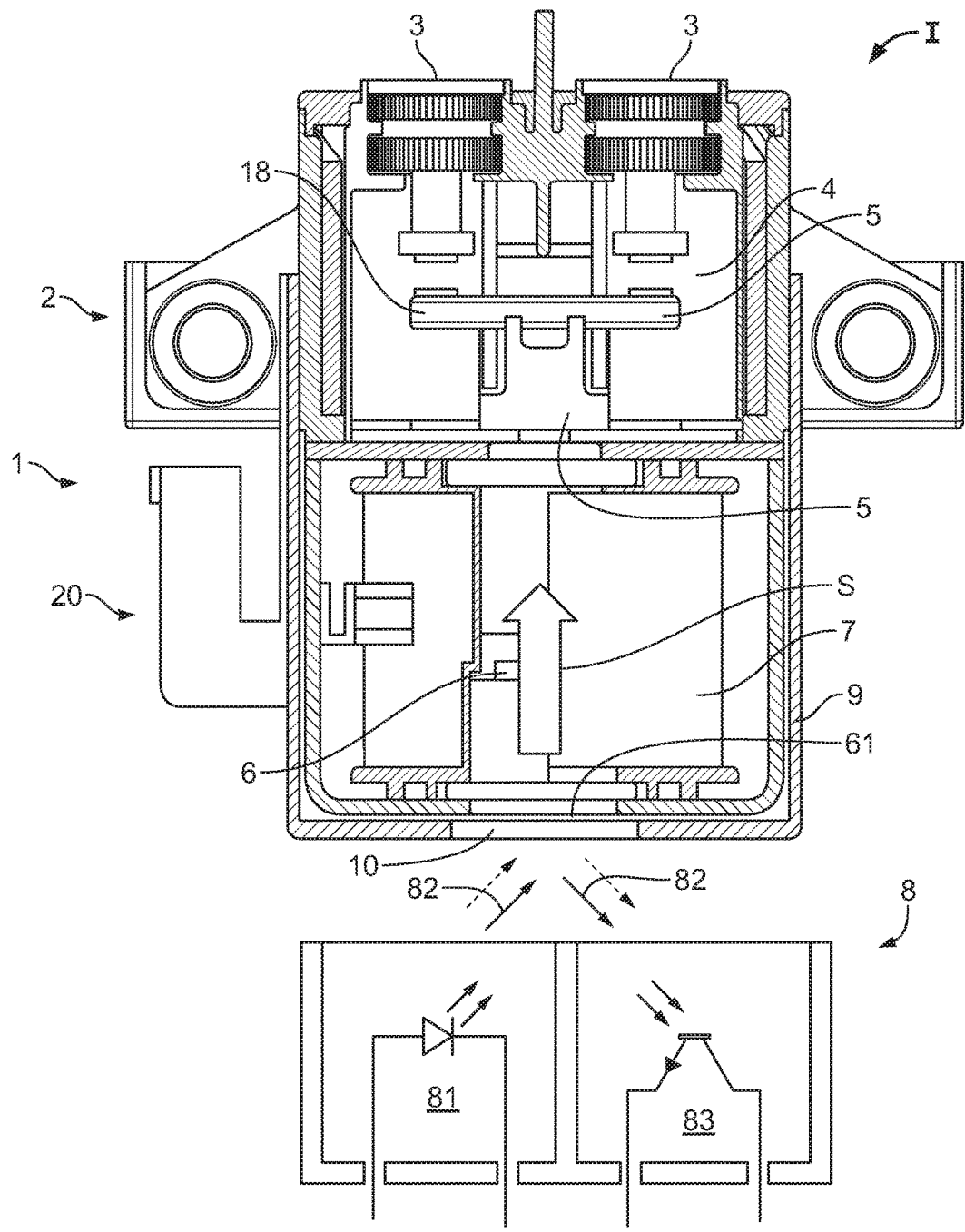
FIG. 1 is a cross-sectional view of a switching assembly.

In an embodiment of FIG. 1, the switching assembly 1 has a switch receiving space 4, and a switching device 2 with a switch 5 and two contacts 3 positioned in the switch receiving space 4. The switch 5 serves to establish or disconnect an electric connection between the two contacts 3. For this purpose, switch 5 is movable between an open position I represented in FIG. 1, in which the contacts 3 are electrically separated from one another, and a closed position, in which the contacts 3 are connected to one another in an electrically conductive manner by the switch 5.

The switch 5 has a contact bridge 18 and an armature 6. Armature 6 is positioned in a coil 7, which is represented partially cut away in FIG. 1 in order to enable a view of further elements. Depending on whether, at which strength, and in which direction a current flows in the coil, and armature 6, the switch 5 is moved in or counter to a switching direction S. Thus the switching device 2 is electrically conductive or electrically insulating between contacts 3. The armature 6 represents a part of a motor 20 for the contact bridge 20.

High currents or high voltages, such as are used, for example, in electric motor cars, may be present at contacts 3. Under such conditions, electric contacts 3 can weld to the switch 5 during use. This can lead to it no longer being possible to open the switching device 2, i.e. adequate insulation can no longer be achieved. This results in a hazard, when maintenance personnel are carrying out work. In order to be able to ensure that switching device 2 is adequately insulated, the switching assembly 1 has a switch status detector 8 which detects the position of the switch 5. In particular, the switch status detector 8 detects whether switch 5 is in the open position I or the closed position. For this purpose, the switch status detector 8 is aligned towards a region of a distal end 61 of armature 6, which is distal to the contacts 3.

In the embodiment shown in FIG. 1, the switch status detector 8 performs optical measurements 8, and is designed as a reflection light barrier. The switch status detector 8 includes a transmitter 81 which transmits a light beam 82 that is reflected in different ways in the region of distal end 61 of armature 6, depending on the position of the distal end 61. Depending on the position of distal end 61, more or less light of light beam 82 is reflected into a receiver 83. The receiver 83 converts the light into an electric signal so that downstream electronics (not shown) can evaluate whether switch 5 is in open position I or in the closed position.

The switch status detector 8 can also be configured so that the presence of switch 5 in the closed position is detected.

In the case of a sufficiently high temporal and/or spatial resolution, movement of the switch 5 and/or the movement of the armature 6 can be measured over the entire armature stroke with temporal and/or spatial resolution. Such a measurement can be used, for example, to identify wear of the switching device. Such wear can be exhibited, for example, in that the stroke of armature 6 and/or switch 5 becomes longer and/or is displaced along switching direction S. A changed movement profile can also indicate wear. Such a changed movement profile can be identified, for example, by contrasting earlier and current location/time characteristics. For example, the position of armature 6 at the point in time of closing of contacts 3 and the end location of armature 6 can be measured. Wear can then be concluded from this data since this length is extended with increasing service life.

In order to enable a light beam 82 to strike the distal end 61 of armature 6, a housing 9 of the switching device 2 has a signal-permeable wall region 10 which is configured as an opening or recess. (See FIG. 1) In another embodiment, a signal-permeable wall region 10 has a transparent window that allows the signals required for measurement to pass through, but enables sealing of the housing 9, in particular a gas- and/or liquid-impervious sealing and high-voltageimpervious sealing. The signal-permeable wall region 10 is positioned on a distal side of housing 9. A motor 20 is positioned between the contact bridge 18 and the wall region 10. Moreover, the motor 20 is positioned between the contact bridge 18 and the switch status detector 8. In an embodiment, the motor 20 is positioned outside housing 9. Generally gas- and liquid-impervious sealing is optional, while voltage-impervious, in particular high-voltage-impervious, sealing is usually sufficient. Dust-impervious sealing is also advantageous.

The wall region 10 is located in a region of the coil 7, namely, in the region of the motor 20. This positioning allows a direct sensing of an element of motor 20, namely of armature 6, without using further intermediate elements.

In the embodiment shown in FIG. 1, the switch status detector 8 and switching device 2 are separated from one another, with both being positioned in their own respective housings. However, while not shown, those of ordinary skill in the art would appreciate in another embodiment, the switch status detector 8 and switching device 2 can be unified in a single housing 9. Such a housing can as a whole, be gas- and/or liquid- and/or high-voltage-impervious. Such a housing 9 includes a high-voltage region in which the contacts 3 are positioned, and a low-voltage region in which low-voltage-operated elements, such as the switch status detector 8, are positioned. Both regions can be separated from one another by a signal-permeable wall region 10, in particular, separated from one another in a gas- and/or liquid- and/or high-voltage-impervious manner.

In an embodiment similar to that shown in FIG. 1, the contacts 3 can be arranged in a first housing and switch status detector 8 can be arranged in a second housing 9. The housing with contacts 3 is a high-voltage housing, and the housing 9 with switch status detector 8 is a low-voltage housing. The two housings can be joined together so that the high-voltage housing is sealed off in a high-voltage-proof manner only in the joined-together state, because open points, such as the wall region 10 can be sealed off by the low-voltage housing. In particular, the high-voltage housing and the low-voltage housing in the joined-together state can produce an entire housing which is gas- and/or liquid- and/or high-voltage-impervious, while in the non-joined-together state, at least one housing is not gas- and/or liquid- and/or voltage-impervious.

In an embodiment, the switch status detector 8 is positioned facing towards the motor 20, permitting the switch status detector 8 to indirectly detect the position of the contact bridge 18, rather than directly detecting the position of the contact bridge 18. The switch status detector 8 is positioned to face a side of the motor 20 that faces away from the contacts 3. The wall region 10, which is permeable for the signals of the measurement with switch status detector 8, is positioned between the switch status detector 8 and the motor 20. This arrangement, since the switch status detector 8 is positioned away from the vicinity of contacts 3, in particular, outside of switch receiving space 4 and housing 9, allows the switch status detector 8 to be protected, since the switch detector 8 is not exposed to the loads or contamination during the switching process. For example, the switch status detector 8 is not exposed to arc plasma which occurs during opening.

Figure 2:
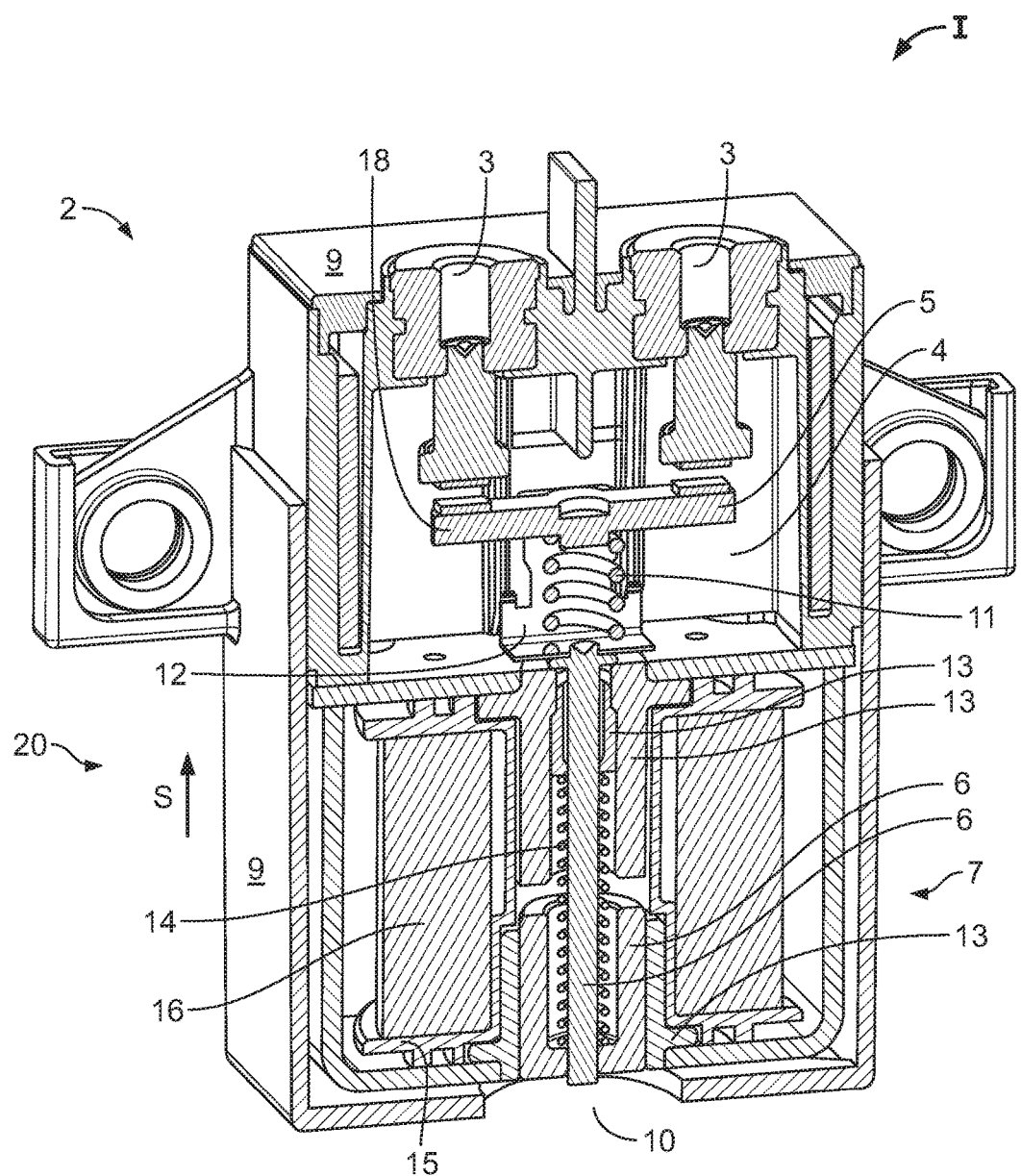
FIG. 2 is a cross-sectional view of a switch.

As shown in an embodiment of FIG. 2, the switching device 2 has a switch 5 that connects contacts 3 in an electrically conductive manner in a closed position. (FIG. 2 shows the contacts in the open position) For this purpose, the switch 5 has the contact bridge 18 connected to the armature 6. The connection between the contact bridge 18 and the armature 6 is through a connection element 12. A spring 11 presses the contact bridge 18 against an upper surface of the connection element 12 or, in the bridging state, against the contacts 3. The armature 6 is positioned in friction bearings 13, which are arranged in a coil 7. A spring 14 prestresses the armature in the direction of open position I. The coil 7 has a coil body 15 and windings 16 which are only represented schematically.

In the embodiment shown in FIG. 2, the signal-permeable wall region 10 an opening in the housing 9. The position of armature 6, and thus of switch 5, can be detected in a contact-free manner through the wall region 10. As a result of the contact-free sensing, no high voltage is transmitted to the switch status detector.

Figure 3A:
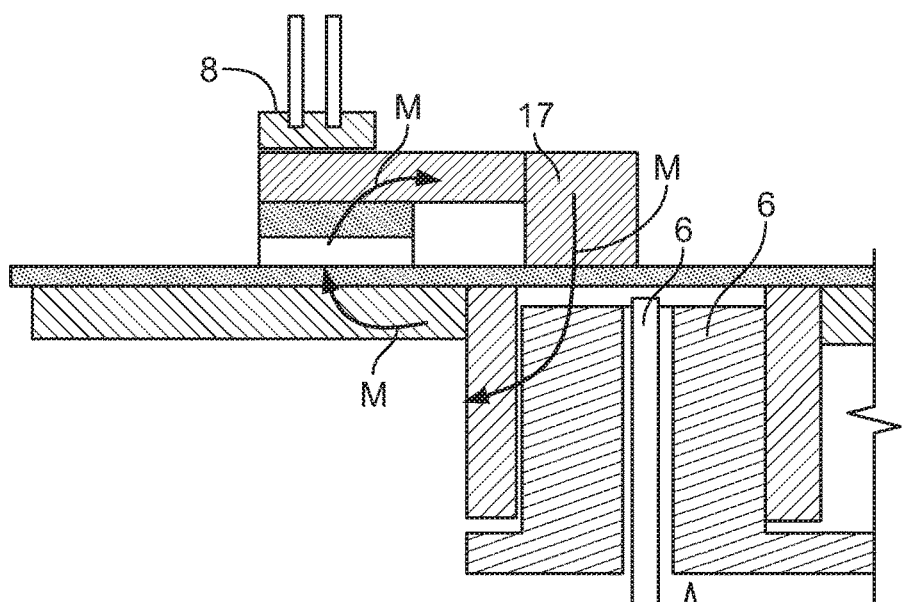
FIG. 3A is a schematic cross-sectional view of a switching assembly having a magnetic switch status detector and being in an open position.
Figure 3B:
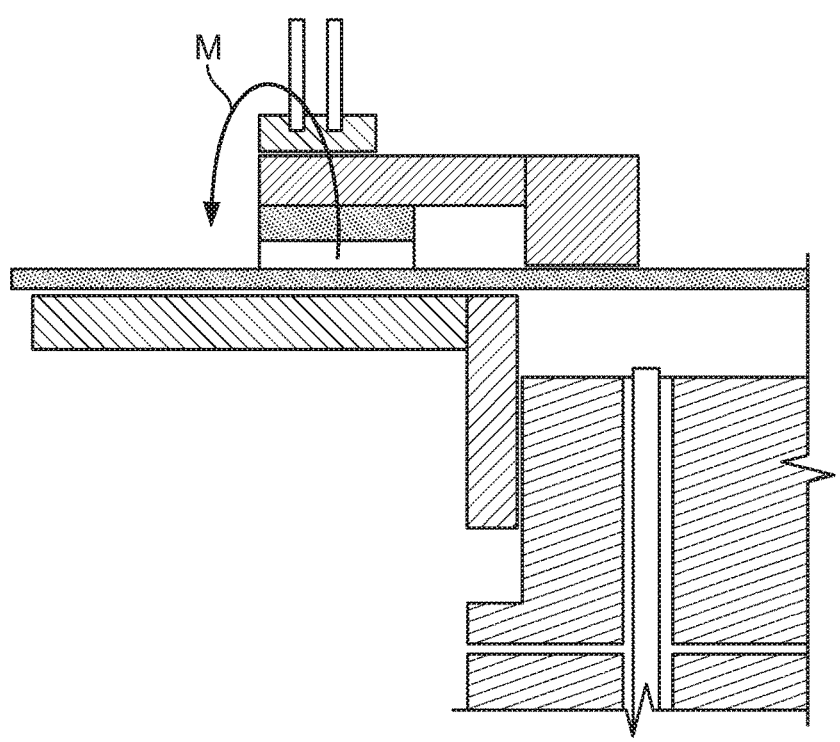
FIG. 3B is a schematic cross-sectional view of the switching assembly of FIG. 3A in a closed position.

In an embodiment shown in FIGS. 3A and 3B, the switching assembly 1 has a switch status detector 8 that is a magnetic sensor which can measure a magnetic field, such as a Hall sensor. Depending on the position of armature 6, a magnetic circuit 17 is closed or open so that the Hall sensor measures a different direction and/or intensity of a magnetic field M. The position of the armature and of switching element 5 connected thereto can thus also be deduced in a contact-free manner. For example, the embodiment in FIG. 3A shows the switching assembly 1 in the open position, and the embodiment in FIG. 3B shows the switching assembly 1 in the closed position.

In another embodiment, the switching assembly 1 has a switch status detector 8 that is an ultrasound sensor.

The above described embodiments of the switching assembly 1 have a number of advantages over the convention switching assemblies, such as the switching assembly 1 measurement method is simpler than the measurement methods involving auxiliary relays. Moreover, by using the contactless measurement, high voltages or current are prevented from being transmitted to the switch status detector. Moreover, defects in the switch status detector do not lead to impairments of the switch, thus making the switching assembly 1 more reliable.

Another advantage is that in addition to detecting the open position and/or the closed position, positions lying therebetween can be detected with an appropriately calibrated switch status detector. In particular, the switch status detector can be calibrated to detect a high or infinite number of intermediate positions, allowing a determination of the position of the switching device in a continuous or quasi-continuous region between closed position and open position.

If the switch status detector allows a sufficiently high resolution of the position, wear and tear of the switching device or the contacts which occurs over longer periods of time can thus also be detected with it. As a result, wear can be identified. If there is an appropriately high temporal resolution of the switch status detector, such wear measurement could also be carried out by measuring the position of the switching device or of an element which motors the switching device at specific points in time. Such points in time are, in particular, the establishment of contact between the contacts by the switching device and the occupation of the end position of the switching device and/or of an element which motors the switching device.

Another advantage is that the contacts can be positioned in a switch receiving space. As a result, protection of the contacts from influences from the outside and protection of other elements from the contacts can be achieved. The switching assembly can be a relay or a protection device.

The use of a switch status detector that can remotely determine the position of the contact bridge instead of requiring direct monitoring of the contact bridge, in particular, where the switch status detector measures the movement of the bridge contact motor through the signal-permeable wall region, enables a simple and compact design.

Additionally, since the motor can be positioned between the contact bridge and the wall region, and the switch status detector can be positioned on the side of the switching assembly opposite the contact bridge in relation to the motor, results a compact configuration and design.

Another advantage is that the position of the switching device, in particular, the position of the contact bar, can be permanently monitored without requiring a special measurement step. Thus the monitoring step is greatly simplified over the conventional methods.

In one simple configuration, the housing is formed at least partially by walls of the contact switching chamber and at least partially by walls of a switch status detector chamber. As a result, the number of components required is reduced.

An additional advantage is that the switch status detector can have a signal output at which a first signal is emitted if the switching device is located in the open position, and at which at least one second signal, which is different from the first signal, is transmitted if the switching device is not located in the open position. Such a configuration enables a simple signal evaluation. Further, a third signal which is different from the first and second signals can be transmitted at the signal output if the switching device is located in a closed position. As a result, positive feedback that the switching device is located in the closed position can be generated.

Although exemplary embodiments have been shown and described, those of ordinary skill in the art would appreciate that changes may be made in these exemplary embodiments without departing from the principles and spirit of the disclosure, the scope of which is defined by the claims and their equivalents.

What is claimed is:
1. A switch assembly comprising:
two contacts;
a switch including a contact bridge, a motor connected to the contact bridge, and an armature connected to the contact bridge, the switch having an open position in which the contacts are electrically separated from one another and a closed position in which the contacts are in electrical contact with each other through the contact bridge, the armature having a distal end positioned opposite the contact bridge that is displaced by the motor when the switch transitions from the open to the closed position;
a switch status detector positioned remotely and electrically isolated from the switch, the motor positioned between the contact bridge and the switch status detector; and
a switching device having a switch housing into which the switch and two contacts are positioned, a wall of the switch housing having a signal-permeable wall region, the distal end of the armature is positioned in the switch housing proximate to the signal-permeable wall region and the switch status detector is positioned outside the switch housing proximate to the signal-permeable wall region.

2. The switch assembly according to claim 1, wherein the switch status detector is positioned to face the motor.

3. The switch assembly according to claim 1, wherein the switch includes a coil and the armature is positioned in the coil.

4. The switch assembly according to claim 3, wherein a position of the armature is detected in a contact-free manner by the switch status detector.

5. The switch assembly according to claim 1, wherein the closed position is detected by the switch status detector in a contact-free manner.

6. The switch assembly according to claim 1, further comprising:
a high-voltage housing into which the contacts are positioned; and
a low-voltage housing into which the switch status detector is positioned, the high-voltage housing or the low-voltage housing being gas- or liquid-tight.

7. The switch assembly according to claim 1, further comprising a housing having:
a high-voltage region into which the contacts are positioned, and
a low-voltage region into which the switch status detector is positioned.

8. The switch assembly according to claim 1, wherein the switch status detector is an optical sensor.

9. The switch assembly according to claim 1, wherein the switch status detector includes a signal output having:
a first signal when the switch is in the rest position, and
a second signal different from the first signal when the switch is in a position other than the rest position.

* * * * *